INVENTORS
C. E. BROOKS
J. L. HENRY
J. A. MEYERLE

BY S E Hollander
ATTORNEY

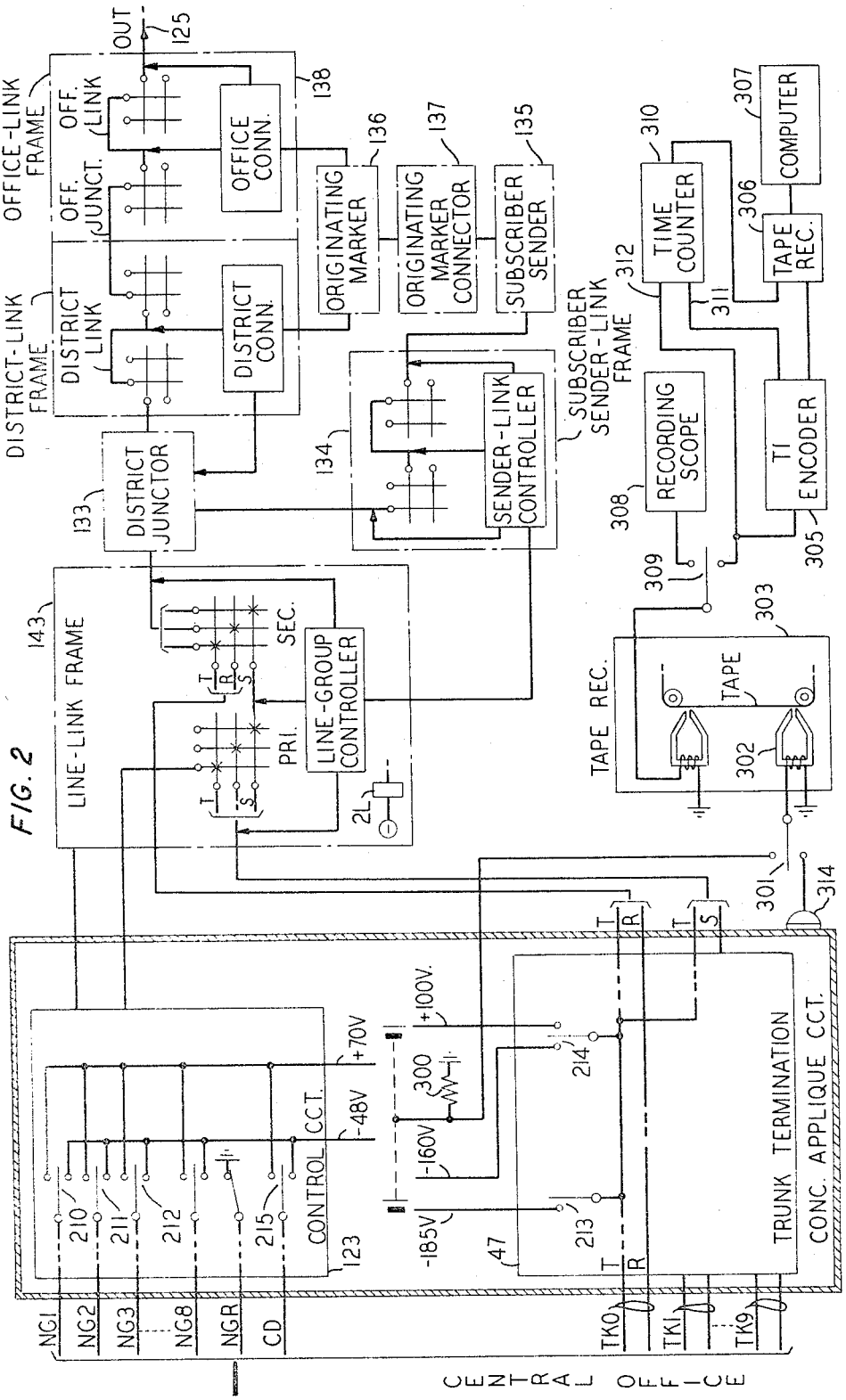

FIG. 3E

| TIME | SUBTRACTION | RESIDUE |
|---|---|---|
| T2 | 92 − 64 | POS. |
| T3 | 92 − (64 + 32) | NEG. |
| T4 | 92 − (64 + 16) | POS. |
| T5 | 92 − (64 + 16 + 8) | POS. |
| T6 | 92 (64 + 16 + 8 + 4) | NEG. |
| T7 | 92 − (64 + 16 + 8 + 2) | POS. |
| T8 | 92 − (64 + 16 + 8 + 2 + 1) | POS. |

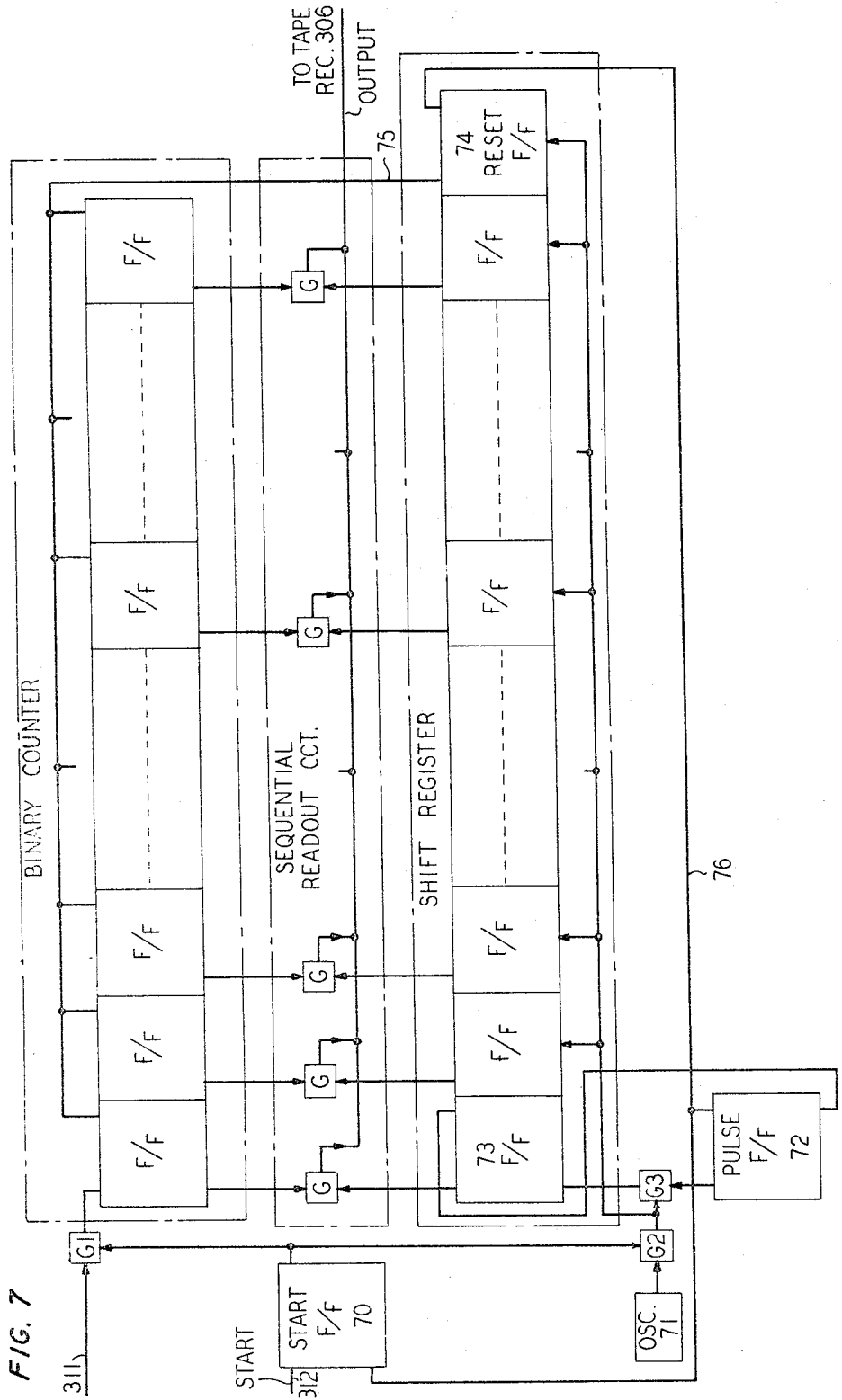

United States Patent Office 3,435,159
Patented Mar. 25, 1969

3,435,159
CIRCUIT AND METHOD FOR TESTING COMPLEX
SYSTEMS
Chester E. Brooks, Montvale, James L. Henry, Madison, and John A. Meyerle, Manasquan, N.J., assignors to Bell Telephone Laboratories Incorporated, New York, N.Y., a corporation of New York
Filed Jan. 3, 1966, Ser. No. 518,467
Int. Cl. H04m 3/22
U.S. Cl. 179—175.2                 19 Claims

ABSTRACT OF THE DISCLOSURE

A system for determining fault conditions in electrical equipment for generating and recording analog signals from contact microphones coupled to the equipment. The analog signals are digitalized and again recorded. The digitalized signals are compared with priorly established normal ranges for said signals. Signals departing from the normal range are identified.

---

This invention relates to a system for and method of monitoring the operation of complex electrical systems and for detecting incipient trouble conditions prior to the actual existence of such trouble conditions.

In the past, the classical approach to monitoring the integrity of operation of complex electrical equipment has included examination of a relatively large number of significant circuit parameters to observe if they are within acceptable limits. Thus, in the No. 5 crossbar system for example, continuous timing operations are performed which relate to the time required to execute particular circuit functions as well as the cumulative time required to execute a series or group of functions.

Viewed from one perspective, this approach to system maintenance presupposes an initial study of the precise relay operating sequences as well as acceptable time periods for each sequence. If a trouble condition is encountered, i.e., if the time required to execute a particular function exceeds the actual time allotted for that function, the circuit timer "times out" and a card is printed reflecting the circuit condition at the time the trouble was encountered. This record includes the identities of the significant relays involved in the circuit function and the operated or nonoperated condition of the relay. This system of trouble detection involves what is sometimes hereinafter referred to as the "microcircuit" approach, that is, an examination of the individual components or instrumentalities of a complex system and a continuous direct observation of such individual elements or microcircuits for correct operation.

Although completely operative and useful as determined by its technical sufficiency for many years, the microcircuit approach includes certain inherent limitations. For example, it is essential in developing trouble detection equipment using the microcircuit approach to first acquire, as described above, an intimate understanding of the specific circuit operational sequences and the relationship between the operating sequences of the specific identifiable components, e.g., relays in the No. 5 crossbar system.

As a brief illustration of the direction which the microcircuit approach takes in consequence of viewing each parameter in the No. 5 crossbar system as a discrete element to be identified individually, one of the recording devices has included therein a trouble record card having 1080 positions arranged in 18 lines of 60 positions each. Moreover, the recorder includes a bank of 120 punches mounted in such a way that they can punch any or all of the 60 positions in each of two lines on the card.

The information for the trouble record is derived chiefly from the marker. Connections between the marker and the trouble recorder are made by multicontact relays which provide paths to a set of 1080 leads—one for each piece of information to be recorded. For further explanation of trouble recording in No. 5 crossbar, reference may be made to an article entitled "Trouble Recording for the No. 5 Crossbar System" by A. C. Mehring, 1950 Bell Laboratories Record, page 112.

Having recorded the multiplicity of information pertaining to a particular trouble condition, a testman or other maintenance employee proceeds to relate the recorded information to the complex relay sequences of marker operation in an effort to ascertain where in the sequence the trouble was encountered and what relays, if any, were subject to malfunction.

Implicit in this procedure is a sophisticated knowledge of crossbar operation requisite to competently discharge the exacting duties required in this type of trouble analysis. It is well known, however, that communications circuitry is becoming increasingly more complex.

Thus, a conflict is presented which involves, on the one hand, the difficulties and expense in acquiring the necessary expertise and, on the other hand, the almost geometrically increasing intricacies of communications circuitry.

It is, therefore, an object of this invention to provide a trouble recording and analysis arrangement which may be exploited without precise knowledge of circuit sequences.

Still another object of this invention is to provide for the trouble analysis of complex communication circuitry without the necessity of continuously observing individual circuit elements in order to evaluate system behavior.

Although the above-referred-to limitations of microcircuit trouble analysis facilities are severe, perhaps the most significant limitation of this type of approach is the necessity of actually experiencing a malfunction before efforts are undertaken to remedy the conditions which gave rise to such malfunction. Apart from being an inherently less efficient (a posteriori) approach, in communication practice where integrity of performance and continued operation is vital, an actual circuit malfunction is intolerable.

It is, therefore, a further object of this invention to provide for trouble recording and analysis by an arrangement and method which predicts a failure condition prior to the actual occurrence of such failure in order to afford maintenance personnel an opportunity to avert the impending failure.

These and other objects and features of the invention may be realized in a specific illustrative embodiment in which an approach to trouble recording is used which departs from the above-referred-to microcircuit approach by viewing overall systemic behavior rather than individual component performance. In consequence of the general view of the system operation which is adopted, this approach is sometimes hereinafter referred to as the "macrocircuit" approach. Thus, in contrast to the 1080 individual conductors in the No. 5 crossbar trouble recorder which convey information respecting sources to be examined, the macrocircuit system of trouble recording is predicated on a single input to the trouble recording device. This input is taken from the system in such a manner that the overall system operation is monitored and, despite the inherent complexity of the system, only a single point of observation is required. Illustratively, the same marker performance which is judged, as described above, in the No. 5 crossbar system may be examined by observing the potential across a low impedance coupled in series to the primary power supply or battery connected to the marker.

For purposes of clarity in explaining the present invention, a somewhat less complex system than the marker, i.e., a telephone concentrator system will be utilized to illustrate the macrocircuit approach. Any electrical function including relay operations and releases will produce a distinctive and uniquely identifiable transient response across the low impedance connected to the concentrator power supply and may be recorded in analog form on a tape recorder, for example.

Alternatively, a simple contact microphone may be mechanically attached to the metal frame of the cabinet which houses the concentrator control unit relays. In this manner, any of the multiplicity of relays which operate will generate a pattern of vibrations in the cabinet which may also be recorded, for example, on a tape recorder. It will be noted in using the macrocircuit approach that a particular function, for example, extending a connection to a calling customer, will produce a uniquely identifiable pattern on the tape recorder, characteristic of this type of operation. Moreover, by repeated operations or by varying the battery potential or other electrical parameters, it may be determined which of the patterns produce acceptable circuit performance and which produce malfunctions. In this manner and by empirical procedures, boundary conditions may be ascertained beyond which failures may be anticipated.

It will be noted that in practicing the macrocircuit approach, knowledge of the intricacies of the equipment to be maintained is unnecessary insofar as the ability to detect and even predict trouble is concerned. As will be shown herein, the arrangement may be completely automated with data information resulting from switching equipment operations being processed by a computer.

Using the automated technique, a record, for example a tape record, may be made of the electrical transients occurring across the above-referred-to impedance in series with the power supply for a line concentrator system of the type described herein. This recording in view of the transformer aspect of magnetic tape recording and playback represents the approximate derivative of the original "raw" or analog transient signal. Thereafter at a convenient time, the tape record may be digitalized using any conventional technique, for example the encoder of the T-1 carrier system described in the Bell System Technical Journal, volume 45, page 1404, dated September 1965. Subsequently, the output of the T-1 encoder, which is in binary form in words of seven digits (and a signal digit), is delivered to a conventional general purpose computer. Initially, the computer preprocesses the information delivered from the output of the T-1 carrier in order to select the significant maxima or peaks and reject or suppress noise signals occurring intermediate the peaks.

In this manner, a record is prepared which may, for example, be that reflecting the circuit operation during the extension of a connection to a remote substation in the line concentrator system and will include illustratively four transient peaks which occurred during the course of current flow through the series impedance as a result of relay operations, etc., as described above. Thereafter, the computer, having priorly stored in its memory a range of acceptable conditions for proper operation of the concentrator equipment, will operate on the input data under control of a simple program which dictates a comparison between each peak and the acceptable maximum and minimum values for such peak stored in memory. If the comparison is favorable, i.e., within the acceptable ranges, no action need be taken. If the comparison indicates that the data peak amplitude is higher or lower than acceptable, the computer is programmed to printout the data peak value together with a comment specifying that a trouble condition exists. Thus, if a peak value of 69 is experienced during a test run and acceptable ranges are 100–110, a trouble condition has been encountered and the computer will render an indication of this face. Similar procedures are followed if the peaks occur other than in acceptable time periods.

In addition, as specified above, the computer using the same program arrangement will be able to indicate incipient or borderline trouble conditions before such conditions occur. For example, if in the above suggested acceptable range of 100–110, an input data peak amplitude was 100, the computer may be programmed to print a different statement indicating a possible future trouble condition in which subsequent peaks on later actual connections of the concentrator equipment may drift to 99 and result in improper operation.

It is understood that having established the fact of an actual or incipient trouble condition, various corrective measures may be undertaken. As a possible illustration, the data peaks may be further processed by the computer on the basis of priorly established empirical investigations made over the course of thousands of actual circuit operations which indicated that a data peak amplitude of 99 represented an increase in the impedance of a relay contact which applies marking potential to one of the concentrator speech conductors. Using a program similar to that described above, the computer may be arranged, moreover, on reception of a peak amplitude of 99 to print a trouble statement which may illustratively read, "TIME 14 HOURS 28 MINUTES 9 SECONDS— DEFECTIVE SETUP TO REMOTE SUBSTATION— CONTACTS ON RELAY TFR AT CONTROL UNIT MUST BE CLEANED."

It is significant to observe that the entire process for maintaining complex circuitry in the manner described may be completely independent of any actual knowledge of the operation of the circuit. All factors regarding normal and abnormal circuit operation may be determined empirically by repeated actual circuit operations and observation of parameters which reflect the overall circuit operation as well as observing the proper functioning or malfunctioning of each operation. In addition, with respect to malfunctions, the specific circuit element giving rise to the malfunction may be isolated empirically, by, on each trouble condition, recording after investigation, the identity of the faulty element and the nature of the difficulty. In this manner, the entire trouble detection and diagnosis process may be automated; in fact, the manner in which the empirical data itself may be accumulated may be by automation or computer controlled techniques.

For this reason, the macrocircuit approach is philosophically related to that classically used in medicine for diagnosis of organic disorder. Thus, the physician need not be and, in many instances cannot be, informed of the manifold, unrelated, metabolic processes which give rise to a pulse rate of 72 per minute with a relatively fixed palpable amplitude. Nevertheless, as a result of his medical training and experience (largely empirical), he may infer that a complex mechanism, such as the heart and circulatory system, is functioning properly. Similarly, if, for example, he detects a rate of 86 with a weaker intensity than he has empirically detected in the presence of normal health, he may possibly infer that the circulatory system is experiencing difficulty or is in a borderline area in which difficulty may ultimately result unless corrective measures are taken.

An alternative arrangement for obtaining information respecting system malfunction is to utilize the same central impedance detector and to deliver the raw signals or analog voltage to a tape recorder. In lieu of digitalizing the analog information in the manner explained above, the information may instead be delivered from the tape recorder to a recording oscilloscope or other device for making a picture record of the original analog data or a related pattern. Thereupon, appropriate masks or overlays which have been previously prepared may be placed over the analog signals in a manner which provides that the analog signal will fall within the mask boundaries if normal, but will exceed the boundaries if abnormal. Illustratively, a mask suitable for use with this arrangement may include, in the transparent areas, distinct color portions. For example, the area of normal operation within the boundaries of the mask may be arranged to appear within a clear transparent area, whereas a boundary condition between proper and improper operation may include a yellow transparent portion. Similarly, an unacceptable pattern which would result in defective operation may comprise a red transparent area.

The procedure for examining the analog signals for proper and improper patterns may be effected by a relatively unskilled attendant who will merely place the appropriate mask on the analog picture waveform and can observe through the clear, yellow and red transparent areas whether a fault condition exists or is about to be encountered.

As explained above, it is unnecessary for maintenance of the communication equipment to be familiar with the actual operating sequence or internal working of the circuitry. Information is nevertheless made available which is indicative of an actual or incipient trouble condition. Logically, it is necessary for the personnel to take action to correct or avert such trouble conditions. In order to accomplish this purpose, it is also unnecessary to be familiar with the precise system configuration. Instead, the above line concentrator system, for example, may be observed over the course of thousands of circuit operations during which a connection has been extended to a calling customer.

The voltage peaks at a power supply series impedance, for example, may be recorded for each successful operation, i.e., extension of a connection. Moreover, during the course of defective operations, the system may be temporarily immobilized after the particular voltage readings at the impedance have been made, and examined internally to observe any evidence of relay or other malfunction. The specific malfunction which is detected will be recorded together with the voltage readings. If the same difficulty occurs repeatedly in conjunction with particular abnormal or marginal voltage readings, an empirical relationship may be assumed. In this manner, over the course of a sufficient number of operations in extending a connection to a customer, the spectrum of possible circuit malfunctions will be observed together with the specific difficulty giving rise to the defective operation. This portion of the trouble analysis may be referred to as diagnostic in comparison with the prior operation of trouble recording. Of course, as will be explained herein, the computer may be programmed to printout a record of the specific difficulty giving rise to the defective operation.

When using the mask technique, a priorly established group of tables or charts giving the empirical relationship between the observed series impedance voltages and the corresponding circuit disorder will be referred to by the maintenance personnel in the event that the signal within the transparent area falls in the yellow or red portions.

These and other objects and features of the invention may be more readily apprehended from an examination of the following specification, appended claims and attached drawing in which:

FIG. 1 shows remote concentrator facilities in accordance with Patent 3,129,291 of C. E. Brooks and J. L. Henry of April 14, 1964, and application Serial No. 243,869 filed December 11, 1962, of C. E. Brooks, G. B. Crofutt, Jr., and J. L. Henry, now Patent No. 3,251,948 issued May 17, 1966;

FIG. 2 includes an outline showing of the central office portion of the above-referred-to concentrator and an outline diagram of the processing equipment responsive to impedance voltage variations or to the contact microphone pickup referred to above;

FIGS. 3A–3E show a typical analog pattern and a typical PCM pattern delivered by the transmitter encoder portion of the T–1 carrier system to the tape recorder for subsequent processing;

FIG. 7 shows a typical time counter.

*General description of concentrator system*

Figure 1:
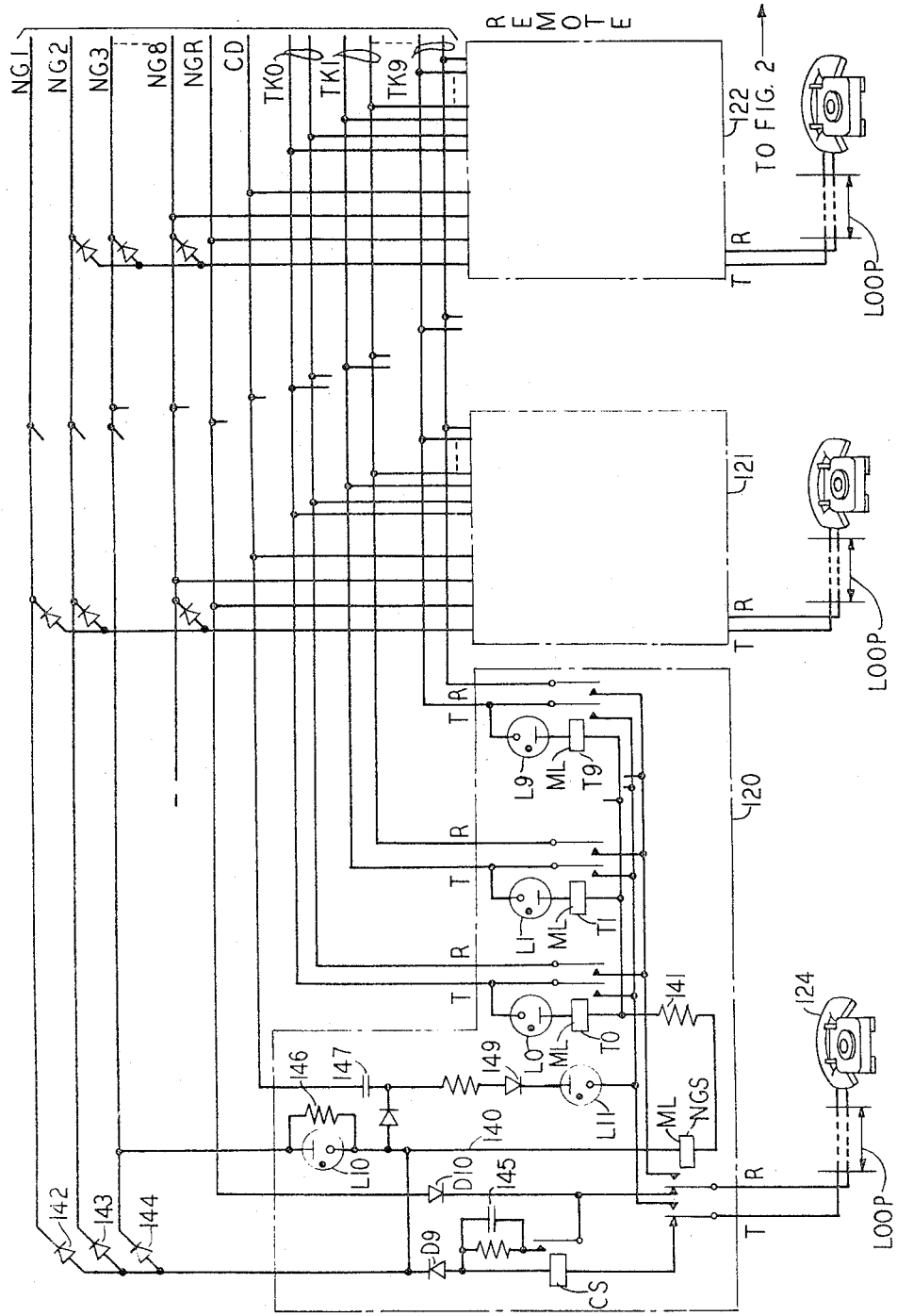

It will be understood herein that the distributed line concentrator of FIGS. 1 and 2 is presented merely as illustrative of the operation of the present invention and that any suitable communication system or other system may be subjected to trouble analysis and trouble diagnosis utilizing related procedures.

However, for purposes of explaining the present invention, a brief description of the operation of the concentrator system in performing a single function will be examined as a preliminary to explaining the method of trouble detection during such an operation. As an illustration, the operation of the system in effecting a connection from the central office to a remote concentrator line will be explained.

It is seen from FIGS. 1 and 2 that a plurality of number group conductors extend from the office. Illustratively, these are eight in number, of which only a portion are shown. In addition, ten speech trunks TK0–TK9 (of which three are shown) are utilized for extending communication paths from the substation lines which may illustratively be fifty in number although only three are known in FIG. 1.

A control circuit 123 and trunk termination 47 both of which are shown in outline form only but explained in detail in the above-referred-to patent of C. E. Brooks and J. L. Henry are utilized to terminate the control or number group conductors and the speech trunks, respectively.

The central office equipment shown in FIG. 2 in dotted outline form constitutes conventional equipment in a No. 1 crossbar office as explained in detail in W. W. Carpenter Patents 2,089,921 of Aug. 10, 1937, and 2,235,803 of Mar. 18, 1941, herewith incorporated by reference.

It will be noted that each of the substation packages 120–122 of which only package 120 is shown in detail includes equipment for connecting each of the lines to a particular group of number group conductors and also facilities for connecting each of the lines to each of the speech trunks TK0–TK9. Thus, diodes 142, 143 and 144 are unique to substation 124 and connect that substation to number group conductors NG1–NG3. Moreover, trunk relays T0–T9 (of which only three are shown) corresponding to trunks TK0–TK9 are available for connecting substation 124 to any one of the ten trunks as required over the contacts of the respective trunk relay T–. In this respect, the "crosspoint" contacts between the lines and the trunks are, in effect, the contacts of relays T0–T9.

Each line package or remote switching unit includes equipment for detecting and forwarding line service requests to the central office which equipment is in the nature of a line relay or sensory mechanism responsive to line off-hook conditions. Relay CS is operated on a line off-hook condition to transmit a signal to the central office.

Moreover, each remote unit is also provided with the usual "cutoff" equipment for divorcing the line from its usual connection to the sensory device (in this case relay CS and the number group conductors) and for connecting the line, instead, to a speech path to the central office over a selected trunk. Relay NGS performs this function in line package 120 and the contacts of relay NGS are seen to transfer the tip and ring conductors of the loop from relay CS and the number group conductors to a multiple connection leading to each of the trunk crosspoints.

Since the line packages 120–122 are remote from the central office and would normally require the transmission of power over substantial distances where continued relay operation is necessary, relays NGS and T0–T9 have been designed as magnetic latching relays of the type disclosed in the above-referred-to patent of C. E. Brooks and J. L. Henry. In consequence, relays T0 and NGS are adapted to have current supplied to their operating windings in two directions. In the first direction (disconnect), the contacts of relay T0 are released and the break contacts of relay NGS are engaged. In the second direction, the contacts of relay T0 are operated to extend a connection and the make contacts of relay NGS are actuated.

Although the equipment for applying marking potentials in the control circuit is shown in outline form only to preserve clarity, suitable control equipment for performing these functions is shown in the above-referred-to Brooks et al. patent. Similarly, with respect to trunk termination 47, the equipment for applying marking potentials is again shown symbolically since the revelation of the detailed equipment is not essential to an understanding of the present invention. For a comprehensive disclosure of suitable equipment for applying the marking potentials in trunk termination 47, reference may be made to the above-referred-to Brooks et al. patent.

In describing the operation of the concentrator, it will be assumed that a party at substation 124 is seeking to effect a connection through the central office to a distant subscriber.

When substation 124 goes off hook, current flows through number group leads NG1–NG3 over a path explained in detail herein and is detected at the central office in the applique circuit 123.

It is seen that remote unit 120 includes equipment for generating a single high intensity identifying pulse on number group leads NG1–NG3 over the contacts of relay CS, also as explained herein.

In conjunction with the identification of the calling line, line relay 2L unique to substation 124 is operated in the manner explained in the above-referred-to patent of C. E. Brooks and J. L. Henry. In response to the operation of the line relay, the line group controller 130 and the sender link controller 131 are energized. These circuits select district junctor 133, sender link 134, and sender 135 and operate the necessary select and hold magnets to establish the connections as disclosed in Patent 2,235,803 referred to above.

After the operation of line relay 2L, arrangements are undertaken in the circuits 47 and 123 to effect a connection to the substation by applying a marking potential to the number group conductors NG1–NG3 unique to the substation and simultaneously applying a marking potential to the tip conductor of the selected trunk. If trunk TK0 is the selected trunk, a path from substation 124 over trunk TK0 to the central office will be established. Thereafter, the circuit may be traced to the subscriber sender 135 which latter transmits dial tone to the calling substation and records the digits dialed at substation 124.

The subscriber sender 135 has access to an originating marker 136 over an originating marker connector 137.

Subsequently, the marker conventionally determines from the called office code the location of the corresponding trunk group on the output of the office link frame 138 and selects an idle trunk 125 in the proper group. Thereafter, the marker establishes a path through the district link frame and the office link frame for connecting the district junctor 133 to the selected outgoing trunk 125. The sender 135 then transmits the called line number to the terminating office and the connection is extended to the calling party. This completes the connection on an originating call.

More specifically, when substation 124 goes off to initiate a service request, the switchhook contacts (not shown) in the receiver are closed and a path is completed over the loop from negative 48-volt battery in the central office, switches 210–212, number group conductors NG1, NG2 and NG3 to diodes 142–144, respectively, in the line package 120. The circuit is further extended over diode D9, winding of relay CS, contacts of relay NGS, tip conductor of the loop, substation 124, ring conductor of the loop, contacts of relay NGS, diode D10 to ground over conductor NGR. This path, when completed, results in the operation of call start relay CS.

When the contacts of relay CS are closed, a pulse of current is delivered through capacitor 145 in view of the sudden low impedance path through diode D10, contacts of relay CS, capacitor 145 and diode D9 to diodes 142–144. This current pulse is extended over conductors NG1–NG3 to relay detecting circuits at the applique circuit in the central office which are not shown in order to preserve clarity but are shown in detail in the above-referred-to patent of C. E. Brooks and J. L. Henry.

The number group detector relays unique to number group conductors NG1–NG3 are operated to record the identification of the calling substation at the central office. Operation of the number group detector relays ultimately results in the operation of a line relay unique to the calling subscriber's line which is shown symbolically in FIG. 2 as relay 2L.

In response to the operation of line relay 2L, the No. 1 crossbar system is operated in a routine manner. Thus, the line group controller 130 and the sender link controller 131 are energized to select an idle district junctor 133, sender link 134 and sender 135.

When the line link primary select magnet (not shown) has operated in the conventional manner, as disclosed in the above-referred-to Carpenter patents, marking equipment is operated to apply marking potentials to the number group conductors and to the tip conductor of the selected trunk. Thus, by the appropriate operation of switches 210–212, the number group conductors NG1–NG3 may be selectively connected to +70-volt battery potential. The manner of this connection is shown symbolically in FIG. 2 for simplicity (see also FIG. 3A). For a detailed explanation of the manner in which the marking potentials are connected by the marking relays, reference may be made to the above-referred-to Brooks et al. patent.

Figure 3A:
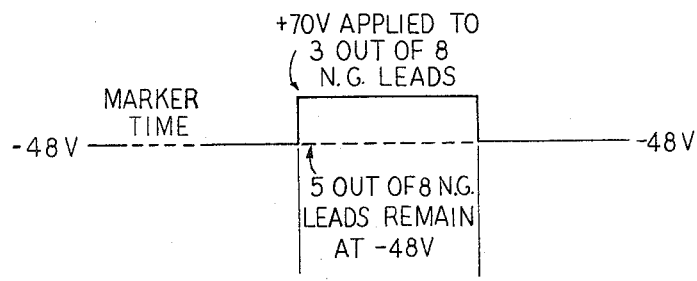
Figure 3B:
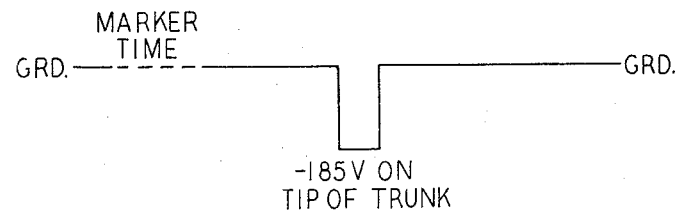

Concurrently, with the application of the +70-volt potential to the number group conductors NG1–NG3 unique to the calling substation line, a −185-volt potential is applied to the tip conductor of the selected trunk which is illustratively trunk TK0 as shown symbolically by the operation of switch 213 (see FIG. 3B). The negative 185-volt potential applied to the tip conductor of trunk TK0 extends to the cathode of gas tube L0. The potential on the anode may be traced from the winding of relay T0, resistance 141, winding of relay NGS, conductor 140, resistance 146, number group conductor NG3 to the positive 70-volt potential source over switch 212. This results in the production of a potential of 255 volts across the gas tube L0. Gas tube L0 fires in consequence of the potential thereacross and the sustain voltage of the tube which may illustratively be 70 volts results in the application of a potential of approximately 185 volts across the electrodes of tube L10 which latter also fires and provides a path for the operation of relays T0 and NGS in series. As current develops in the windings of relay T0 and NGS, the contacts of relay T0 which were previously open are closed and latched in the closed condition, and the contacts of magnetically latching relay NGS transfer the loop conductors T and R from the number group conductors NG1–NG3 and NGR to the tip and ring conductor of the selected trunk TK0 over the contacts of relay T0. At this time substation 124 is connected to the central office over the trunk TK0, thus completing the connection to the calling substation. Thereupon switches 213 and 210–212 are successively opened. As indicated in the general description, the subscriber will ultimately be connected to a subscriber sender 135 and routine control operations will be initiated in the No. 1 office to effect a connection to the called party whose directory number is dialed into the subscriber sender 135.

Having explained the overall operation of the concentrator system during the extension of a connection to a remote line, the manner in which the trouble recording and diagnosing method is practiced will be explained.

As noted in the above procedure, the application of voltage potentials to the number group and trunk conductors during the course of establishing a connection includes the application of +70-volt marking potentials to selected number group conductors. Subsequently, the −185-volt signal is applied to the tip of the selected trunk and is then removed after the calling subscriber has been connected to the trunk and disconnected from the number group leads and the NGR lead. Later the three number group leads with +70 volts connected to them are returned to −48 volts when switches 210—212 release.

Figure 3C:
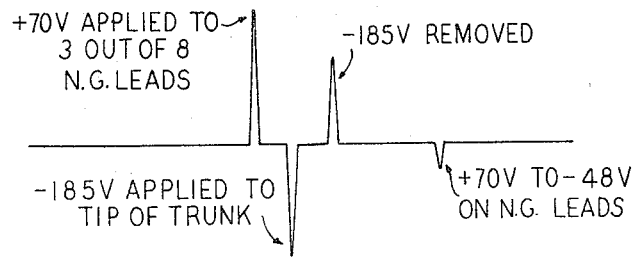

The actual voltages applied to the number group conductors are shown in FIG. 3A and the voltage applied to the tip conductor of the selected trunk is shown on FIG. 3B. As indicated above, the transformer action of the magnetic tape and playback head results in a differentiation of the voltages appearing across the impedance 300 (which are derived, in part, from charging of the distributed cable capacitance) in consequence of the signals shown in FIGS. 3A and 3B. As a result, a signal pattern similar or related to that shown in FIG. 3C is obtained in which a positive going potential results in a positive peak and a negative going potential in a negative peak, whereas constant potentials produce no signal output from the tape. Using this procedure, variations in potential across the series impedance 300 will be transmitted over switch 301 and tape head 302. In consequence, the tape recorder 303 will, on playback, produce analog signals similar to that shown in FIG. 3C. In order to process this information by computer, it is desirable to digitalize the analog information, thus recorded, and, illustratively, any convenient analog to digital converter may be used. Thus, the T–1 carrier system described in the above identified article is useful in accepting an analog signal or pulse amplitude modulated signal and converting it to a pulse code modulated signal. The functional operation of the T–1 carrier system is not vital to an understanding of the present invention.

Figure 3D:
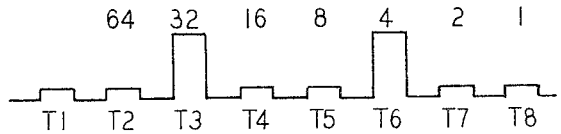

It will suffice to appreciate that an encoder in the T–1 carrier transmitter compares the pulse amplitude modulated or analog input signal every 125 microseconds with the output of a binary network which subtracts from the input signal a succession of weighted amplitudes. In the first comparison, the binary network subtracts 64 units from the input signal. If the signal is illustratively 92, the residue is positive and the comparator yields a zero at its output which is transmitted as the first PCM pulse at time D2, as shown in FIG. 3D. (Time D1 is used for other than intelligence information, i.e., it is used for signaling.) Thereafter, the binary network successively subtracts 32 units, 16 units, 8 units, 4 units, 2 units and 1 unit, as shown in chart 3E. The actual output code transmission is the complement of the PCM signal. Functionally, the purpose of the encoding operation insofar as the present arrangement is concerned is to yield a digital binary code equivalent to the input analog signal. The operation of an illustrative encoder is explained herein with respect to FIG. 6.

Thus, if the output on tape recorder 303 is coupled through switch 309 to the transmitter encoder portion of the T–1 carrier system 305, a binary code version of the signals shown in FIG. 3C is obtained which may be transferred to tape recorder 306 and stored therein. Thus, the T–1 carrier encoder has accepted analog signals of the form shown in FIG. 3C from tape recorder 303 over switch 301 and converted them to binary signals of the form shown in FIG. 3D prior to storage in the tape recorder 306.

Subsequently, the output of the tape recorder may be delivered to the computer 307 which may illustratively be an IBM type 7094 or any other suitable general purpose computer.

It is assumed that priorly the computer 307 has had stored therein a series of tables which indicate acceptable values, boundary values and unacceptable values for the respective peak signals shown on FIG. 3C. These values as shown for example in Table 1 have been prepared using the empirical technique described above in which the circuit has been repeatedly operated and voltages appearing across impedance 300 recorded for each of the definitive operating phases.

In the following table the distance between peaks is designated as D— and the amplitudes of the peaks are designated as Y—. The specific values for D— represent the number of 125 microsecond intervals between peaks whereas the specific values for Y are arbitrary units (with a maximum of 127) as determined by the encoder to be representative of the amplitude of the incoming analog peak.

TABLE 1.—SET-UP
[Extension of Connection to Remote Line]

NORMAL AND MARGINAL RANGES

D(2) 142, 144–168, 170    Y(1) 95, 97–105, 107
D(3) 232, 234–398, 400    Y(2) 84, 86– 94, 96
D(4) 123, 125–148, 150    Y(3) 47, 49– 57, 59
                          Y(4) 20, 22– 30, 32

VALUES STORED IN MEMORY

|        | (1) | (2) | (3) | (4) |
|--------|-----|-----|-----|-----|
| DMAX   |     | 170 | 400 | 150 |
| DMAXB  |     | 168 | 398 | 148 |
| DMIN   |     | 142 | 232 | 123 |
| DMINB  |     | 144 | 234 | 125 |
| YMAX   | 107 | 96  | 59  | 32  |
| YMAXB  | 105 | 94  | 57  | 30  |
| YMIN   | 95  | 84  | 47  | 20  |
| YMINB  | 97  | 86  | 49  | 22  |

The manner of introducing the information stored in Table 1 into the memory of computer 307 is entirely conventional and may be through the use of a conventional READ statement. This may illustratively be in the manner indicated in "A Guide to FORTRAN Programming," published by John Wiley and Sons, Inc., 1961, by D. D. McCracken.

The subranges shown in Table 1 may illustratively be a fixed number of units, e.g., two units as shown, or may be a fixed percentage of the normal range. Thus, the subranges may be established automatically when the normal range has been arrived at in the empirical manner discussed above.

Subsequently, any individual operation on an originating setup or extension of a connection to a calling customer may be analyzed by comparing the individual data thus assembled for each connection to the priorly recorded criteria established in Table 1 for proper and improper operation. Thus, for example, the following Table 2 is indicative of data obtained from a series of operations in extending a connection to a calling customer.

TABLE 2

| Number | D   | Y   |
|--------|-----|-----|
| 1      |     | 100 |
| 2      | 160 | 80  |
| 3      | 200 | 61  |
| 4      | 124 | 21  |

As disclosed in the above identified text by McCracken, the data in Table 2 which is prepared from tape recorder 306 may be assembled on punched cards and delivered to computer 307 or alternatively may be assembled on punched cards and stored in still another tape recorder (not shown) and thereafter delivered to computer 307. In any event, the information stored in Table 2 may be compared with the information stored in Table 1 by means of the following program or FORTRAN statement.

IW=0

```
    DØ 40 I=2, J
    IF (D(I)-DMIN(I)) 10, 11, 11
11  IF (D(I)-DMINB(I)) 10, 12, 12
12  IF (DMAX(I)-D(I)) 10, 13, 13
13  IF (DMAXB(I)-D(I)) 10, 40, 40
40  CØNTINUE
    DØ 50 I=1, J
    IF (Y(I)-YMIN(I)) 20, 21, 21
21  IF (Y(I)-YMINB(I)) 20, 22, 22
22  IF (YMAX(I)-Y(I)) 20, 23, 23
23  IF (YMAXB(I)-Y(I)) 20, 50, 50
50  CØNTINUE
    IF (IW) 100, 100, 80
10  IW=IW+1
    GØ TØ (70, 71, 72, 73, 74), I
20  IW=IW+1
    GØ TØ (75, 76, 77, 78, 79), I
71  PRINT 91, D(2)
    GØ TØ 40
72  PRINT 92, D(3)
    GØ TØ 40
73  PRINT 93, D(4)
    GØ TØ 40
74  PRINT 94, D(5)
    GØ TØ 40
75  PRINT 95, Y(1)
    GØ TØ 50
76  PRINT 96, Y(2)
    GØ TØ 50
77  PRINT 97, Y(3)
    GØ TØ 50
78  PRINT 98, Y(4)
    GØ TØ 50
79  PRINT 99, Y(5)
80  PRINT 90, IHØUR, MIN, SEC
90  FØRMAT (1H+2I, 5H HRS 2I, 5H MIN F4.1,
    4H SEC//)
100 More program
```

In analyzing the operation of the above program with respect to the data included in Table 2, it will be appreciated that the effect of the execution of the program is merely to compare the data in Table 2 with the acceptable ranges and marginal ranges in Table 1. Thus, DMIN represents the lowest normal value acceptable for the time interval D(2) between adjacent peaks Y(1) and Y(2). Illustratively in Table 1, it is seen that this value is 142. Actually so far as the present calculations are concerned, 142 may illustratively represent 142 intervals of 125 microseconds each—the sampling interval of the T–1 carrier encoder.

The value for the time interval may conveniently be obtained from a conventional binary counter such as counter 310 operated by a clock generator associated with the encoder each 125 microseconds over conductor 311. Moreover, the counter 309 may illustratively be reset in response to each output peak amplitude from the differentiated analog signals over conductor 312. Illustratively, the binary count, thus arrived at, will reflect the time interval between adjacent peaks and will be included on tape recorder 306 in a channel parallel to that used for recording the signal peak information. Thus, the adjacent parallel channels will reflect the signal peaks and the time at which these peaks occur (with respect to a reference time base). The manner of operation of a typical counter is explained herein with respect to FIG. 7.

Again, examining interval D(2) of Table 1, the upper acceptable interval is 170 representing DMAX in the program of Table 3. The marginal ranges are between 142 and 144 for D(2) at the lower limit and between 168 and 170 at the upper limit.

Similarly, the peak values of Table 1 are reflected as YMAX for the upper acceptable peak amplitude, e.g., 107 for Y(1), and YMIN (lowest acceptable peak) is 95 for the lower acceptable limit of Y(1). The subranges for the signal peaks for Y(1), for example, are 95 to 97 at the lower limit and 105 to 107 at the upper limit.

Although interval D(2) and peak Y(1) have been discussed above, it is apparent that similar analysis with respect to acceptable ranges and marginal subranges apply to intervals D(3) and D(4) and to peaks Y(2), Y(3) and Y(4).

Prior to a discussion of the execution of the program of Table 3, it will be noted that the information stored on tape recorder 306 may be preprocessed using conventional technique to extract the complement of the signals stored thereon thereby restoring the original signal weights or values. Moreover, the single peak values shown may be obtained by conventional techniques on computer 307, or alternatively it may be assumed that the encoder 305 delivers only a single word output for the differentiated signal.

With this information as a foundation, the execution of the program of Table 3 with respect to the data obtained during a typical setup or extension of a calling customer will be examined. As an illustration, the execution of the FORTRAN program of Table 3 will be explained using the data of Table 2. The first DØ statement in the program dictates that the following statements up to statement 40 be executed repeatedly. In the illustration, the first execution will be with I equal to 2. After each succeeding execution, I will be incremented by 1 until I equals J. Priorly, the value of J which is illustratively 4 for a setup or extension of an originated connection to a calling customer is stored in memory.

For reasons which will appear herein, J will conveniently represent the total number of peaks or the total number of Y's for a particular pattern. As indicated for an extension of a connection, 4 peaks will be encountered, as a result of the actual operating procedure.

In the first IF statement, the first value of D from Table 2 or 160 is compared with the minimum acceptable value 142 from Table 1. (Since there will always be one less "D" than "Y," D(2) is considered as the first interval to make the program equally applicable to "D's" and "Y's".) The operation of the IF statement provides that if the difference is negative, statement 10 is executed next, if the difference is zero, statement 11 is executed and if the difference is positive, statement 11 is executed. In the above illustration, the difference is +18 and, as a result, statement 11 is executed.

In statement 11, a similar IF statement compares the data time interval which is illustratively 160 for D(2) with the borderline minimum interval 144 of Table 1. This time the difference is +16 and in consequence statement 12 is executed.

In statement 12, the maximum acceptable value of D(2) which Table 1 indicates is 170 is compared with the data time interval of 160. Here again, the difference is positive (+10) and statement 13 is the next statement executed. In statement 13, the data value of the time interval which is 160 is compared with the borderline maximum voltage D(2) or 168. The difference (+8) is positive and the IF statement dictates that statement 40 be executed. The latter provides that the program be continued in the DØ loop.

Thereafter, the same series of expressions are again executed with I equal to 3. In this instance, the data value 200 is compared with the ranges and subranges for D(3) of Table 1 and, when completed, I is again incremented and the data value 124 of Table 2 is compared with the ranges and subranges for D(4) of Table 1.

From the above explanation, it is seen that the data value 200 when compared with DMIN(3) will be −32 or negative and as a result the IF statement dictates that statement 10 be executed. Statement 10 provides that the program continue at statements 70–74 which dictates the printing out of the respective values for D(2), D(3) and D(4). Since this is a setup or extension of a connection, D(5) is nonexistent.

After the print statement, the DØ loop is continued and, since the data value for D(4) is 124, the first expression D(4)−DMIN(4) is positive (+1) indicating that statement 11 must be executed. However, when statement 11 is executed, the value of D(4)−DMINB(4) is (125−125) or negative, dictating that statement 10 leading to printout be executed in the manner described above. This procedure continues until the first DØ loop is completed.

As indicated above, the second DØ statement of the program dictates that all of the following statements including statement 50 be executed repeatedly with the values for I from 1 to J, incremented by 1 after each operation. Also as indicated above for a setup or extension of a connection, J (the number of peaks) is 4.

In the first expression, the data value of Y for the first peak Y(1) (Table 2) is compared with the minimum acceptable value of Y(1) from Table 1 or 95. The difference is +5 and the IF statement dictates that the next statement to be executed is statement 21.

In statement 21, the data value for Y(1) or 100 is compared with the borderline minimum YMINB or 97. The difference again is positive (+3) and statement 22 will be executed. Thereafter, the program continues in a manner similar to that described above for the interval comparison between the data of Table 2 and the ranges and subranges of Table 1.

It will be noted that the data value Y(1) or 100 is within the acceptable range and not within the subranges. In consequence, no printout will occur. When the DØ loop is in the second cycle, however, the data value for Y(2) or 80 is found to be lower than YMIN(2) or 84. In this case, statement 20 will be executed which leads to a printout of all the Y values at statements 75–79. In this case only print statements 75–78 are required since only 4 peaks are involved.

During the third cycle of the DØ loop when the data value Y(3) or 61 is compared with YMAX(3) or 59 a negative result (−2) is obtained dictating a printout similar to that described above.

During the fourth cycle, the data value for Y(4) or 21 is compared with YMINB(4) or 22 and a negative result (−1) obtains, dictating that statement 20, the printout instructions, be executed.

The details of the PRINT and FØRMAT statements leading to the printout are not essential to an understanding of the present invention. Reference may be made to the above-mentioned McCracken text for a full exposition of the Fortran PRINT statement.

On the completion of the program, additional program fragments, not shown herein, may be utilized in which the values will include as data only those abnormal values of time intervals and peaks printed out during the preceding portion of the program. Similar comparisons may be made at this time, for example using IF statements, with respect to Y(2) of 80 in order to ascertain the specific circuit defect which resulted in the abnormal peak of 80. This arrangement referred to above may dictate further printout in conjunction with the data peak of 80 indicating "CONTACTS ON RELAY TFR AT CONTROL UNIT MUST BE CLEANED."

Figure 4:
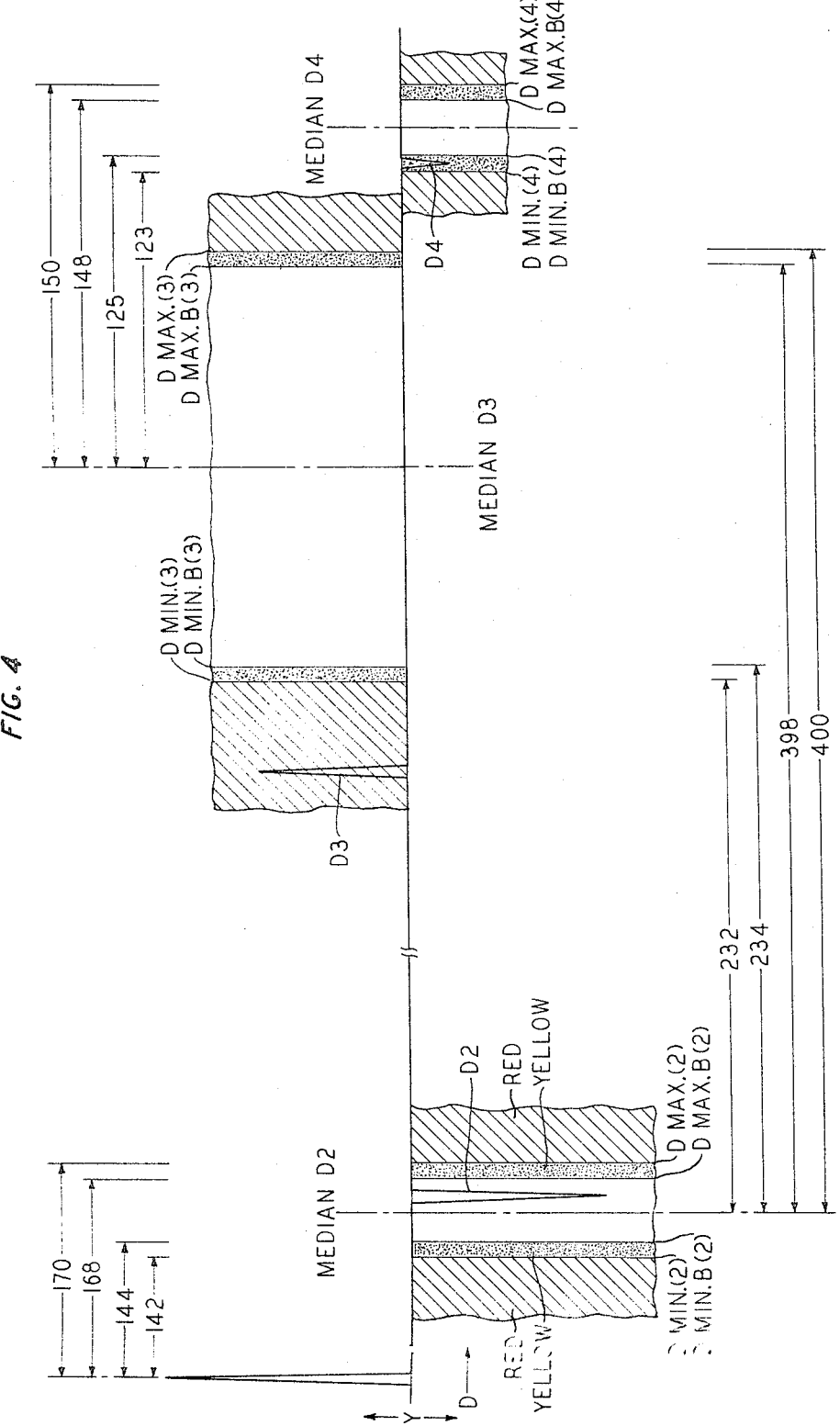
FIGS. 4 and 5 show the manner in which a prepared mask may be superimposed on analog signal data.

In lieu of delivering information from the tape recorder 303 to the T–1 encoder, the differtntiated analog signal may instead be delivered by switch 304 to recording oscilloscope 308 (e.g., a Tektronix 564 storage oscilloscope, Honeywell 1508 Visicorder, high persistence screen, etc.) which will provide a pattern similar to that shown in FIG. 3C. The operator or testman may thereupon take the picture pattern from the oscilloscope 308 and superimpose thereon a mask similar to that shown in FIG. 4 which has been prepared according to a pattern which reflects the manner in which Table 1 was obtained. Thus, the overall dimensions of the cutout portion of the mask reflect the acceptable limits of performance of the circuitry. Illustratively, the mask will have three distinct color-coded transparent portions in the cutout area. If the pattern falls entirely within the transparent area, no trouble or incipient trouble condition exists. If, however, a portion of the analog signal falls within a yellow transparent area, a marginal trouble condition is indicated, whereas if the analog signal falls within the red transparent area, an unacceptable or trouble condition exists. A mask of suitable type is shown in FIG. 4.

In this manner, the attendant may receive immediate visual verification of proper or improper performance of the concentrator circuitry during the establishment of a connection to an originating customer. Moreover, the specific circuit characteristic which gives rise to the malfunction may be determined by reference to a table prepared in the manner described above which would indicate for each specific abnormal value a corresponding circuit difficulty or difficulties empirically established which give rise to the abnormal reading. In effect, this table may comprise a printout of the information stored in the computer as described above respecting the relationship between individual abnormal data values and corresponding circuit difficulties giving rise to these values.

The above description of the operation of the program in selecting acceptable values for both time and amplitude is analogous to the procedure described herein using appropriate masks. Thus, referring to FIG. 4, it will be noted that the time intervals are disposed along the "X" axis and the amplitude levels along the "Y" axis. Using the first peak as a reference for the "X" axis values or time values, the mask is prepared by simply measuring the appropriate number of 125 microsecond units from the reference or starting point. Thus, with respect to the first interval D(2) the lowest acceptable range is 142 units. The marginal condition at the lower range extends to 144. The upper acceptable interval is 170 and the marginal range extends to 168. In preparing the mask, a clear transparent area would exist in the vertical plane between 144 and 168. The area below 142 would be red and the area above 170 would be red.

For D(3) the time intervals are measured from the median acceptable level of D(2) or 156. Here again, the upper and lower ranges and marginal subranges are specified. Similar red, yellow and clear transparent areas are utilized to indicate improper operation, marginal operation and correct operation, respectively.

The interval D(4) is measured from the median (244) of the acceptable values for D(3). Here again, the upper and lower ranges and marginal subranges are specified.

In utilizing the masks, a specific pattern generated in the manner described above from the recording oscilloscope may illustratively yield time intervals and peak amplitudes in accordance with those shown in Table 2. Thus, in referring to FIG. 4, the first peak is illustratively located at the reference point of the "X" axis. The next peak is 160 time units after the first peak and falls within the clear area of the mask. The third peak falls 200 units after the second peak. In utilizing the mask of FIG. 4, however, it is necessary in examining a succeeding time interval to place the preceding peak, wherever it may have fallen, at the median point of the time interval in which it was expected (after noting any improper operation). Thus, when the second peak which, in fact, occurred at 160 is moved to 156 (the median) the third peak D3 falls 200 units thereafter or short of the minimum acceptable time, i.e., in the red area. This, of course, denotes to the attendant an improper performance and appropriate action may be taken as explained herein.

Again moving the mask so that the third peak appears at the median of its expected time interval (316 units after the median of D2), the fourth peak will fall according to the data of Table 2, 124 units thereafter. Since the minimum acceptable interval is 123 and the subrange is from 123–125, the data interval of 124 falls in the borderline or yellow area of the mask. Here again, the attendant notes the irregularity and may proceed to take measures appropriate thereto as explained herein.

Figure 5:
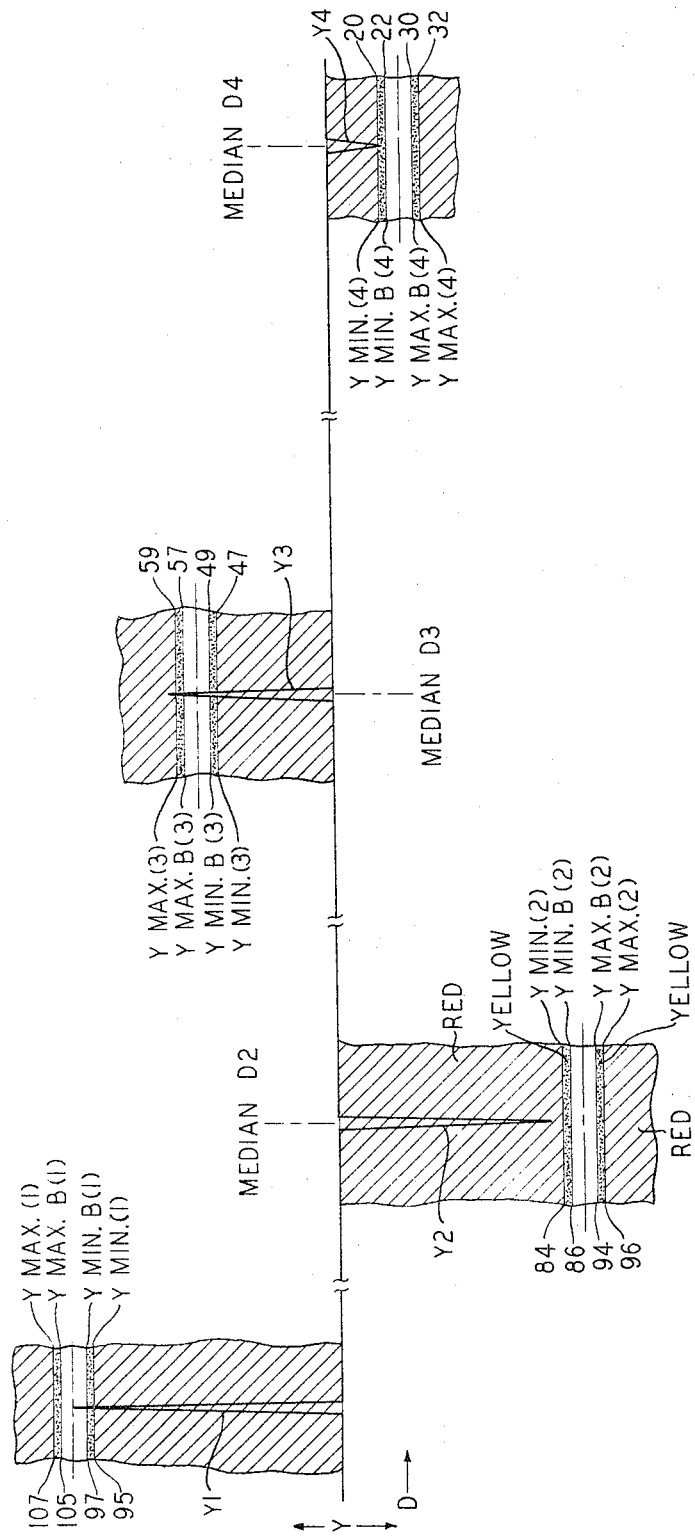

After checking the data pattern for appropriate time intervals in the manner explained above, the amplitudes of the four peaks obtained as data in Table 2 may be compared by using the mask of FIG. 5 which again provides clear, red and yellow transparent areas.

Thus, when the first peak of 100 is compared on the mask, it is seen that it falls between the transparent area 97–105 and represents accurate operation.

The second peak which has a data value of 80 from Table 2 is less (when shifted to its median time interval) than the minimum acceptable value of 84, as shown on mask 5 and thus falls within the red area.

Again shifting the third peak to its median time interval, the third peak may be compared with the range and subranges dictated by the mask. Thus, Y(3) from Table 2 or 61 is higher than the maximum acceptable Y(3) from Table 1 and falls in the red area.

Finally, after shifting the fourth peak to its median time interval, the data value of 21 from Table 2 is compared with the lower range 20–22 of Y(4) and obviously falls within the yellow area.

Having assembled this information respecting the time intervals and peak amplitudes, the attendant may thereupon refer to a handbook or table which may illustratively be a printout of the information stored in the computer respecting each abnormal parameter and the corresponding cause and remedy. Again illustratively, the data peak of 80 for Y(2) may in the handbook which the attendant consults dictate that the "CONTACTS ON RELAY TFR AT CONTROL UNIT MUST BE CLEANED."

Alternatively, in lieu of using transients across the series impedance, the vibration of the cabinet or rack on which the applique circuitry of FIG. 2 is mounted may be monitored by a contact microphone 309 (which may illustratively be an Electro-Voice Model No. 805) when switch 301 is in the appropriate position. At this time, the information delivered to the tape recorder is analogous to that derived from the transients across the impedance 300. For each relay operation, the cabinet or rack will vibrate in a pattern which, for example, will permit the selection of peak amplitudes and time intervals similar to those described in FIG. 4. It will be appreciated that using the contact microphone technique will result in a larger number of signals being recorded on tape recorder 303 in view of the multiple vibrations of the cabinetry as compared to the relatively discrete changes in potential in the circuit as shown in FIGS. 3A, 3B, and 3C. Nevertheless, the information recorded on tape 303 after being digitalized by the encoder of the T–1 carrier system 305 and temporarily stored in tape recorder 306 may be processed by the computer 307 to extract the significant peak signals and time intervals between peak signals in the manner described above. Thereafter, the program for controlling the computer is also similar to that described above. Moreover, the recording oscilloscope and mask techniques may be utilized in conjunction with the contact microphone by preparing an appropriate mask in a manner similar to that described above for electrical transient observation or by using a stationary mask on a high persistence oscilloscope and moving the traces.

In addition, a clip-on transformer may be utilized in lieu of the series impedance 300. Such a transformer would merely be magnetically coupled to the ground conductor extending to the power supply or collectively coupled around all of the power supply outputs.

Figure 6:
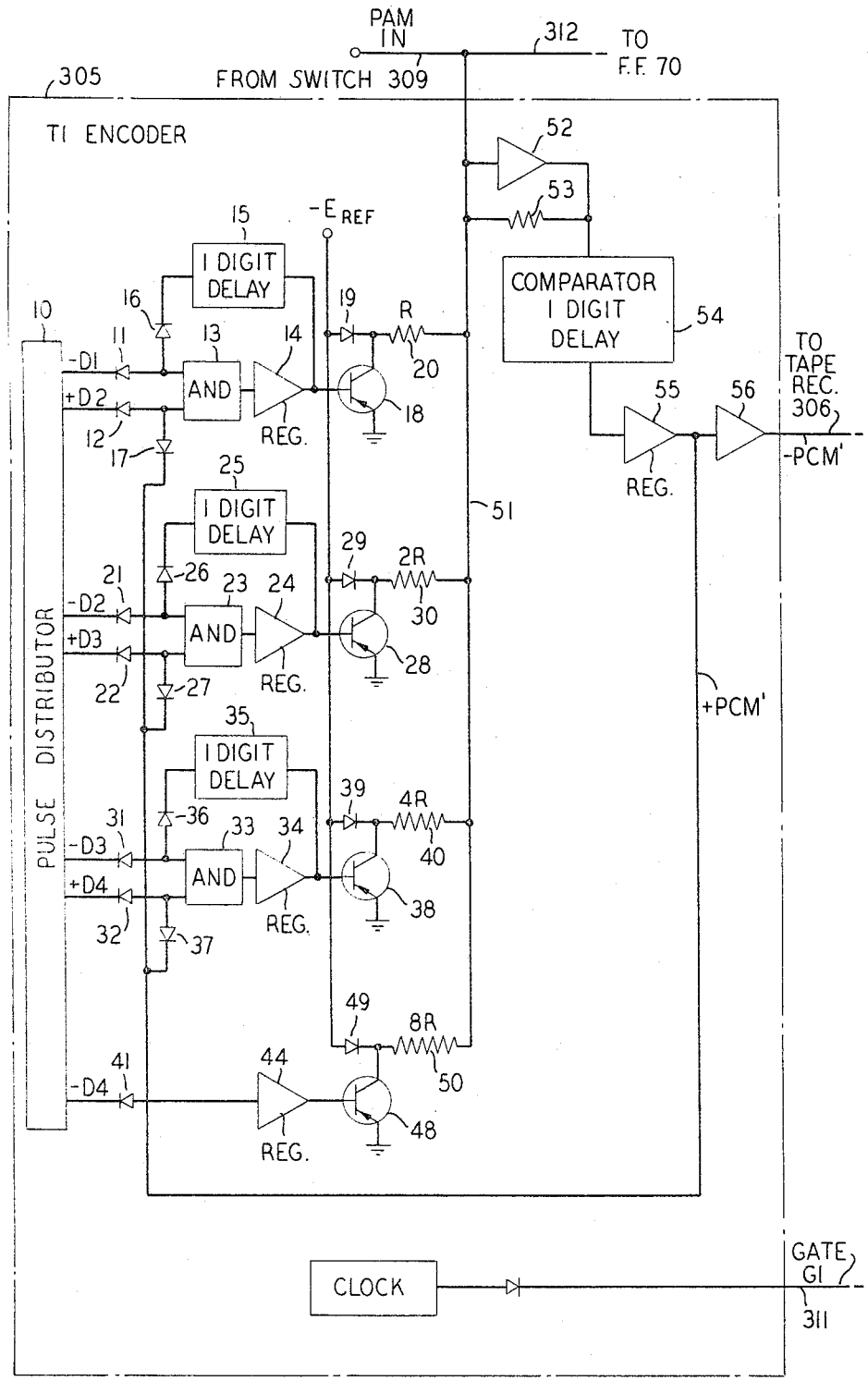
FIG. 6 shows a typical encoder.

A typical encoder for use as the encoder 305 is shown in FIG. 6. This encoder and a more complex circuit also suitable for use as an encoder are shown in Patent 3,051,901 of R. E. Yaeger of August 28, 1962, and reference may be made to that patent for a detailed description of the operation thereof. It will suffice to indicate briefly herein the overall operation. The weighting resistors referred to in the above description of the encoder include resistors R, 2R, 4R, etc.

The signal amplitude samples to be encoded are supplied directly to output bus 51 with a plurality opposite to that of the reference pulses. As indicated in the Yaeger patent, the weighting resistors are related to one another in magnitude by power of two and form a weighted summing network for the reference current pulses generated in the respective channels including amplifiers 14, 24, 34, etc. Although only four channels are shown, it is understood that a greater number may be utilized as is indicated in the above description and also in the Yaeger disclosure.

The operation of the encoder of FIG. 6 includes transforming simultaneous reference pulses from the individual channels into a combined reference pulse for comparison purposes. Depending on whether the combined reference pulse is larger or smaller in magnitude than the analog sample being encoded, a mark or space is delivered by the comparison circuit 54 and ultimately delivered to the encoder output terminal.

A typical time counter for use as counter 310 of FIG. 2 is shown in FIG. 7. The individual flip-flop circuits and connections therebetween may be of the type shown in detail in the General Electric Transistor Manual, sixth edition, 1962. Illustratively, pulses from the clock associated with the encoder are delivered to gate G1 of the counter over conductor 311. Gate G1 is conducting except when a readout is being performed. The binary counter registers the number of pulses (125 microsecond units) delivered over conductor 311.

Readout is accomplished on reception of an analog peak signal as explained in the above description to energize start flip-flop 70. The latter energizes gate G2 which permits signals from oscillator 71 to be delivered to gate G3 which is in the conducting condition when flip-flop 72 is in the "zero" condition. Pulses from oscillator 71 cause information (a "one" condition) to be propagated to the right.

The first pulse from oscillator 71 through gate G2 when it switches to the conducting condition causes the first flip-flop 73 of the shift register to enter a one condition. The transition of flip-flop 73 to the one condition drives flip-flop 72 to the one condition causing gate G3 to switch to a high impedance or blocking condition. As additional pulses are delivered through gate G2, the one condition stored in flip-flop 73 is shifted to the right. All other flip-flops remain in the "zero" condition.

As the one condition is propagated sequentially AND gates G corresponding to the associated flip-flops in the shift register are sequentially rendered conducting (one at a time) in order to read out the count on the binary counter to the tape recorder 306.

When the one condition in the shift register reaches flip-flop 74, the one state of flip-flop 74 drives all of the binary counters to the reset condition over conductor 75. The next pulse from oscillator 71 normalizes flip-flop 74 and the transition resets flip-flop 72 as well as flip-flop 70 over conductor 76. Gate G2 is thereupon returned to the blocking condition and gate G1 is reenabled to permit counting the 125 microsecond units until the next analog peak again causes a readout.

It is understood that numerous other digitalizers or encoders and time counters may be utilized in lieu of those adverted to above.

It is to be further understood that the above-described arrangements are illustrative of the application of the principles of the invention. Numerous other arrangements may be devised by those skilled in the art without departing from the spirit and scope of the invention.

What is claimed is:

1. The method of determining fault conditions in electrical equipment comprising the steps of recording analog signals generated by said electrical equipment during control operations, comparing peak amplitudes of said signals with priorly established normal peak amplitudes for said signals, and identifying such signals which depart from said normal peak amplitudes.

2. A method of determining trouble conditions in complex communication equipment comprising the steps of recording timed analog signals generated by control operations in said equipment, digitalizing said timed analog signals, comparing said digitalized signals with priorly established normal values for said signals and with priorly established normal time intervals between said signals, and identifying those signals which depart from said norms.

3. A system for determining fault conditions in electrical equipment comprising means for generating electrical analog signals in response to control operations in said equipment, means for digitalizing said analog signals, means for comparing said digitalized signals with priorly established normal bounds for said signals, and means for identifying such signals which depart from said normal bounds.

4. A system in accordance with claim 3 wherein said means for comparing said signals includes computer means.

5. A system for determining fault conditions in electrical equipment in accordance with claim 3 wherein said means for generating analog signals includes power supply means for said electrical equipment and impedance means connected to said power supply means.

6. A method for determining fault conditions in switching equipment comprising the steps of generating analog signals uniquely representative of significant equipment functions, recording said analog signals, digitalizing said recorded analog signals, recording said digitalized analog signals together with the time interval intermediate said signals, comparing said recorded digitalized analog signals with priorly established normal bounds for said signals and with priorly established normal time intervals intermediate said signals, and identifying such signals which depart from said bounds.

7. A method for determining fault conditions in electrical equipment comprising the steps of generating timed analog electrical signals uniquely representative of specific operations in said equipment, recording said analog signals, visualizing said recorded analog signals, and masking said visualized analog signals with a mask incorporating normal bounds for said signals and normal time intervals intermediate said signals to identify such signals which depart from said bounds.

8. A system for determining fault conditions in complex electrical equipment comprising electromechanical transducer means responsive to vibrations in said electrical equipment for generating analog signals uniquely representative of specific operations in said equipment, and means for comparing said analog signals with priorly established normal bounds for said signals to identify such signals which depart from said bounds.

9. A method for determining the integrity of circuit performance in complex electrical equipment which comprise the steps of repeatedly operating said equipment in a specific circuit function, recording analog signals generated in said equipment during said operations together with an indication of proper or improper circuit performance, recording a normal range of said analog signals during which proper circuit performance occurred, recording additional analog signals generated during subsequent control operations in said equipment, digitalizing said subsequent analog signals, comparing said subsequent digitalized analog signals with said priorly recorded normal range, and identifying such signals which depart from said normal range.

10. A method for determining fault conditions in telephone switching equipment comprising the steps of repeatedly operating said equipment in a specific circuit function, extracting an analog signal from said equipment uniquely representative of said circuit function, recording peak amplitudes of said analog signals and time intervals intermediate said peak amplitudes together with an indication of corresponding normal or defective circuit functioning, recording a normal range of signals and time intervals during which normal performance occurred, recording said signals and time intervals at fixed distances from the extreme boundaries of said range as a marginal subrange indicative of an incipient trouble condition, subsequently generating additional analog signals during operations of said electrical equipment, recording said additional analog signals, digitalizing said recorded analog signals, comparing said digitalized recorded analog signals with said normal range, comparing said digitalized recorded analog signals with said subranges, and identifying such signals which are included in said subrange or depart from said normal range.

11. A method for determining fault conditions in electrical equipment comprising the steps of recording analog signals generated by said equipment during operations of said equipment, recovering selected portions of said signals, comparing said selected portions of said signals with priorly established normal ranges for said selected signals, and identifying said selected signal portions which depart from said normal ranges.

12. A method for determining fault conditions in electrical equipment in accordance with claim 11 including in addition recording the time periods at which said selected signal portions occur with reference to an initial selected portion of said signals, comparing said time periods with priorly established normal ranges for said time periods, and identifying such periods which depart from said normal ranges.

13. A method for determining fault conditions in electrical equipment in accordance with claim 12 including in addition recording selected signals equal to a predetermined percentage of said normal ranges as marginal subranges within said normal ranges indicative of incipient trouble conditions comparing said selected portions of said signals with said marginal subranges, and identifying said selected portions which fall within said subranges.

14. A method for determning fault conditions in electrical equipment comprising the steps of generating timed analog electrical signals uniquely characteristic of control operations in said equipment, recording said analog signals, reproducing a visual image of said analog signals, and superimposing on said image a mask incorporating normal ranges for said signals and time intervals intermediate said signals and subranges within said normal ranges indicative of incipient trouble conditions to identify those signals which depart from said normal ranges or fall within said subranges.

15. A method for determining and diagnosing fault conditions in electrical equipment comprising the steps of recording analog signals generated during control operations in said equipment, recovering portions of said signals, comparing said portions of said signals with priorly established normal ranges for said signals, and recording for such signals which depart from said normal ranges a diagnosis of the difficulty causing said departure together with the corrective procedure.

16. A method for determining and diagnosing fault conditions in electrical equipment in accordance with claim 15 including in addition comparing said portions of said signals with priorly established subranges within said normal ranges, and recording for such signals which fall within said subranges an indication of an incipient trouble condition together with the required remedial action.

17. A system for determining fault conditions in communication equipment comprising contact microphone means mechanically coupled to said communication equipment and responsive to vibrations therein for generating analog signals characteristic of control operations in said equipment, means for recording said analog signals, means for digitalizing said recorded analog signals, means for recording said digitalized signals, computer means for comparing said recorded digitalized signals with priorly established normal ranges for said signals, and means for identifying said signals which depart from said normal ranges.

18. A system for determining and diagnosing fault conditions in complex electrical equipment comprising power supply means for said equipment, means coupled to said power supply means for generating analog signals uniquely representative of control operations in said equipment, means for recording said analog signals, means for generating a visual image of said recorded analog signals, and masking means having a plurality of distinct relatively transparent areas indicative of normal ranges and subranges for superimposition on said image for identifying said signals which depart from said normal ranges or fall within said subranges.

19. A system for determining fault conditions in communication systems comprising contact microphone means responsive to vibrations in said equipment for generating electrical analog signals uniquely representative of control operations in said equipment, means for recording said analog signals, means for generating a visual image of said recorded analog signals, and masking means having distinct transparent areas thereon representative of normal ranges and subranges for said signals for superimposition on said image to identify said signals which depart from said normal ranges or fall within said subranges.

References Cited
UNITED STATES PATENTS

| | | |
|---|---|---|
| 2,909,769 | 10/1959 | Spaulding. |
| 3,242,477 | 3/1966 | Frothingham. |
| 3,281,834 | 10/1966 | Caspers. |
| 3,286,032 | 11/1966 | Baum. |
| 3,218,633 | 11/1965 | Weinstein. |
| 3,336,590 | 8/1967 | Kaneko. |

KATHLEEN H. CLAFFY, *Primary Examiner.*

ARTHUR A. McGILL, *Assistant Examiner.*

U.S. Cl. X.R.

324—77; 340—146, 347